United States Patent [19]
Holmberg

[11] 4,065,071
[45] Dec. 27, 1977

[54] SAFETY BELT RETRACTOR

[76] Inventor: Göte Eskil Yngve Holmberg, Postlada 2010, S-330 20 Anderstorp, Sweden

[21] Appl. No.: 719,477

[22] Filed: Aug. 31, 1976

[30] Foreign Application Priority Data

Sept. 2, 1975 Sweden .............................. 7509720

[51] Int. Cl.² ...................... A62B 35/02; B65H 75/48
[52] U.S. Cl. ...................... 242/107.4 A; 242/107.4 B
[58] Field of Search ................ 242/107.4 R, 107. 4 E; 297/388; 280/744–747

[56] References Cited

U.S. PATENT DOCUMENTS

| 3,190,579 | 6/1965 | Spouge et al. | 242/107.4 B |
| 3,929,300 | 12/1975 | Lindquist | 242/107.4 B |
| 3,958,774 | 5/1976 | Penzkofer et al. | 242/107.4 A |

FOREIGN PATENT DOCUMENTS

| 2,339,878 | 2/1974 | Germany | 242/107.4 A |
| 2,408,458 | 9/1974 | Germany | 242/107.4 A |

Primary Examiner—Stanley N. Gilreath
Assistant Examiner—John M. Jillions

[57] ABSTRACT

Safety belt retractor having a locking mechanism which is operatively connected with the spindle of the retractor and comprises a rotor connected with the spindle, and at least one locking element displaceably arranged in the rotor, said locking element being engageable with an associated stationary locking element by a relative rotational movement of the spindle and the rotor for locking the spindle against rotational movement, and a device sensitive to inclination and/or deceleration, which is adjusted, by inclination of the retractor or retardation of a vehicle in which the retractor is mounted, from a disengaged position to an engaged position restraining the rotation of the rotor to provide a relative rotational movement of the spindle and the rotor at initial withdrawal of the belt and thus locking of the spindle in order to prevent continued withdrawal of the belt. The rotor comprises a support mounted for rotation in relation to the spindle and having two radially displaceable locking members mounted therein which are spring biased in order to engage a non-circular portion of the spindle, and a toothed rim to be engaged by said device sensitive to inclination and/or deceleration, is rotatably mounted on the support and is rotatable therewith by way of a resilient drive connection.

12 Claims, 8 Drawing Figures

SAFETY BELT RETRACTOR

The present invention relates to safety belt retractors such as are commonly used in motor cars, having a locking mechanism which is operatively connected with the spindle of the retractor and comprises a rotor connected with the spindle, and at least one locking element displaceably arranged in the rotor, said locking element being engageable with an associated stationary locking element by a relative rotational movement of the spindle and the rotor for locking the spindle against rotational movement, and a device sensitive to inclination and/or deceleration, which is adjusted, by inclination of the retractor or retardation of a vehicle in which the retractor is mounted, from a disengaged position to an engaged position restraining the rotation of the rotor to provide a relative rotational movement of the spindle and the rotor at initial withdrawal of the belt and thus locking of the spindle in order to prevent continued withdrawal of the belt.

Retractors of this type are known wherein the locking mechanism practically without exception consists of a great number of parts which are rather complicated from a manufacturing and mounting point of view.

A primary object of the invention is to provide a retractor of the type referred to having a locking mechanism which is more advantageous from a manufacturing point of view, which can be made from simple pressed or moulded pieces, and in which several parts can be mounted together to individual units before the final assembly of the retractor; such units can be combined with each other in a simple way in final assembly.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the retractor of this invention comprises a frame, a spindle rotatably mounted in said frame, means biasing said spindle in a belt-retracting direction a non-circular portion formed by said spindle, a locking mechanism operatively connected with the spindle for rotation therewith and for displacement thereby between nonrotating locking and rotatable nonlocking positions; and including a support mounted for rotation in relation to the spindle, two opposed radially displaceable locking members mounted on the support, spring means biasing the locking members to resiliently engage said non-circular portion of the spindle at slow rotational movements of the spindle, a stationary locking element, said locking members being displaced by the spindle into engagement with said stationary locking element by a rapid rotational movement of the spindle exceeding the biasing force of the spring means, whereby the noncircular portion cams the locking members into nonrotating locking position with the stationary locking element for locking the spindle against rotational movement, a second locking mechanism cooperating with the first locking mechanism to actuate the first in response to at least one of the parameters inclination and deceleration of the retractor, the second locking mechanism including a toothed rim and a resilient drive connection between the support and the toothed rim; and further including a locking means responsive to inclination or deceleration of the retractor for engaging said toothed rim to thereby prevent said toothed rim from rotating with the spindle and thereby actuate the first locking mechanism.

In order to illustrate the invention an embodiment thereof will be described in more detail in the following with reference to the accompanying drawing which is incorporated in and constitutes a part of this specification.

Figure 1:
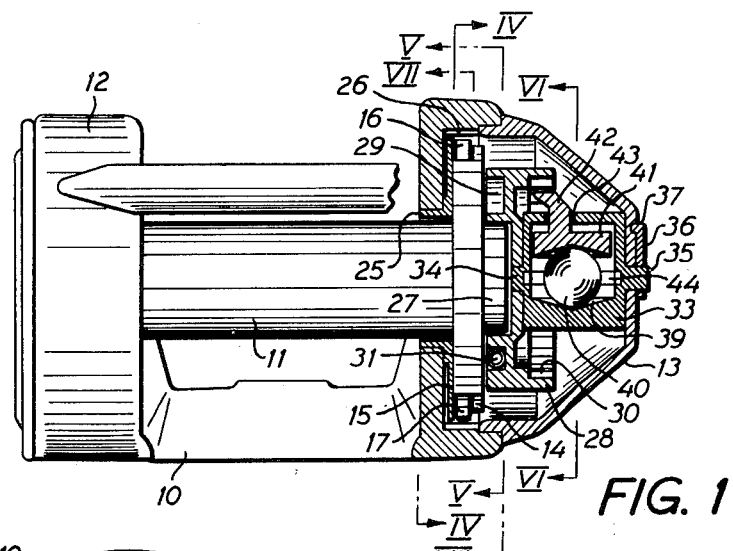
FIG. 1 is a side view partially an axial sectional view of a motor car safety belt retractor according to the invention.

Reference will now be made in detail to the present preferred embodiment of the invention, an example of which is illustrated in the accompanying drawing.

The motor car safety belt retractor shown herein comprises a frame 10 in which is rotatably mounted a spindle 11 for winding up the belt. A spiral spring (not shown) is provided at one end of the frame in a spring case 12 and is tensioned upon withdrawal of the belt from the retractor. Onto the other end of the frame is slipped a cover 13 which encloses a locking mechanism arranged at this end for locking the spindle against withdrawal of the belt from the retractor, dependent upon of the speed at which the strap is withdrawn from the retractor, and of the inclination or deceleration of the motor car in which the retractor is mounted.

The locking mechanism comprises a support 14 provided with a lid 15. These two elements can be made of plastic and may be permanently interconnected after the parts to be contained therein have been located on the support. Said parts comprise two locking members 16 which are made as identical, almost U-shaped pressed pieces of sheet metal. Each locking member comprises a projecting toothed edge portion 17, a central recess 18 and at one side of this recess a protrusion 19 and at the other side a recess 20. The two locking members are located in the housing 14 in such a way that the protrusion 19 of one locking member engages the recess 20 of the other locking member, the two recesses 18 forming a central elongated opening between the two locking members. A portion 21 of the spindle 11, forming opposite flat surfaces, is received in said opening, and the two locking members are biased to engage this portion of the spindle by two bar springs 22 such as wire or plate springs which are mounted on the support 14. The ends of each spring engage abutment shoulders 23 on the support, and approximately at the central portion the spring engages a projection 23' on the associated locking member 16. Said projections 23' are guided for limited radial displacement in slots 24 in the lid 15, and the support 14 is connected to the spindle 11 by the engagement of members 16 with the flattened portion 21 of the spindle in the manner described in order to rotationally connect the support including the lid and the locking members, to the spindle. However, the spindle is received with clearance in a connection piece 25 provided on the lid 15 said lid and thus the support is rotatably mounted in the frame 10 by means of said connection piece.

As can easily be seen, the locking members 16 will be separated by cam action provided by the flat portion 21 of the spindle 11 if the spindle is rotated in relation to the support. The toothed edge portions 17 of the locking members are normally retracted into the support, but at such relative rotation between the support and the spindle the locking members will be cammed out from the support to engage portions 17 with an interior toothed rim 26 provided on the frame 10.

If the belt which is wound on the spindle 11 is withdrawn quickly from the spindle 11, the spindle will rotate in relation to the housing 14, since the housing due to the inertia thereof cannot catch up with the rotation of the spindle and, thus, such a quick withdrawal of the belt results in interengagement of toothed portions 17 of the locking members 16 and the toothed rim 26. Accordingly the spindle will be locked thereby locking the belt against continued withdrawal. This known function of a retractor for motor car safety belts is achieved according to the invention by a very simple mechanism, in which the two locking members 16 as mentioned above can be made as pressed pieces of sheet metal, while the support 14 including the lid 15 can be injection moulded of suitable plastic material. The mounting of the locking members is simple, since the members can easily be placed in the support 14 and then the springs 22 can be properly engaged in a simple manner. Thereafter the lid 15 is put on and is attached to the support e.g. by ultrasonic welding, and the unit produced in this way can easily be mounted in the frame 10 on the end of the spindle 11 by inserting the flattened portion 21 of the spindle into the elongated opening defined by the recesses 18, the connection piece 25 simultaneously being introduced into the mounting opening therefor in the frame.

In order to engage the locking mechanism not only according to a quick withdrawal of the belt but also according to inclination or retardation of the motor car in which the retractor is mounted, there is a supplementary device which provides an improved security of locking of the belt in case a collision or a sudden retardation of the motor car should take place. It is true that a sharp pull on the belt will cause the belt to be locked against continued withdrawal, but in the retractor described as well as in several retractors previously known the locking is initiated not only by the acceleration of the belt but also by a retardation of the motor car, often associated with a collision, or by an inclination or tilting of the car which also often occurs in connection with collisions.

The inclination and deceleration sensitive locking device is of a weak construction, since the purpose thereof is not to lock the spindle 11 against rotation but only to restrain the rotation of the support 14, so that locking of the spindle 11 achieved in the manner described will be initiated. On a connecting piece 27 formed by the support 14 a wheel 28 is rotatably mounted, which forms four curved cavities 29 at the side thereof facing the support, and which has at its opposite side a toothed rim 30 having inside teeth. This wheel is arranged to be rotated with the support 14 when rotated by the spindle 11, and the drive connection provided for this purpose is resilient and comprises a helical pressure spring 31 which is located in one of the cavities 29 and is guided in this cavity, and a projection 32 arranged on the support 14 and extending axially into the cavity 29 receiving the spring. Accordingly, the spring is engaged between this projection and one of the radial walls of the cavity 29. At the center of the wheel 28 a housing 33 is rotatably mounted by a pivot 34, this housing also being rotatably mounted in the cover 13 by a pivot 35. On the pivot 35 there is located a radially projecting arm 36 stationarily attached to the pivot and having a small protrusion 37 at its free end. By means of the arm 36 the housing 33 can be adjusted by rotation to any one of two mutually perpendicular positions which are determined by recesses 38 in the cover 13. The arm 36 can engage via the protrusion 37 thereof either of the recesses 38 but can be lifted out from the recess owing to the fact that the arm 36 is made somewhat resilient. Like the housing 33 and the wheel 28 it can be made of plastic. The housing 33 forms a conical bowl 39, and in this bowl a steel ball 40 is located which can roll freely in the bowl. A plate 41 rests on the ball. The contact surface thereof abutting the ball has a conical form corresponding to the conical form of the bowl 39, and a latch 42 formed integrally with this plate projects through an opening 43 in the upper wall of the housing 33 and extends inwardly below the toothed rim 30 of the wheel 28.

Figure 7:
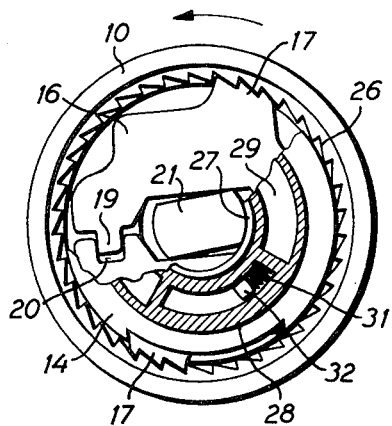
FIG. 7 is an elevational view along line VII — VII in FIG. 1 parts being broken away.
Figure 8:
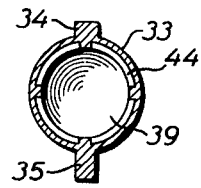
FIG. 8 is a horizontal sectional view along line VIII — VIII in FIG. 6.

The retractor is mounted with the housing 33 in such a position, that the latch 42 is directed substantially vertically upwardly and that the plate 41 rests on the ball 40 as is shown in FIG. 1. If the motor car is inclined or undergoes a sharp retardation, the ball will roll sideways in the bowl 39 and will thereby press out the latch 42 so that it engages the toothed rim 30 on the wheel 28. Thereby, the wheel 28 will be stopped in relation to the support 14 and the spindle 11, so that the support will be restrained under compression of the spring 31. Then, the two locking members 16 are positively spaced by the relative rotation of the spindle 11 and the support 14 in order to engage the toothed rim 26 as shown in FIG. 7. Hence, there is in this case a positive engagement of the locking mechanism of the spindle 11 according to inclination or deceleration of the motor car and independently of the speed of withdrawal of the belt from the retractor. Since the drive means between the support 14 and the wheel 28 is resiliently yieldable, the device responsive to inclination and deceleration will not be subjected to a heavy load; the spindle 11 will be locked by the locking members 16 before the yield distance of the drive means has been utilized during relative movement of the support 14 and the wheel 28. It is of course necessary to dimension the locking mechanism in such a way, that the projection 32 will not be allowed to positively drive the wheel 28 in the rotational direction of the support 14, before the locking members have engaged the toothed rim 28 at their toothed portions 17.

Figure 6:
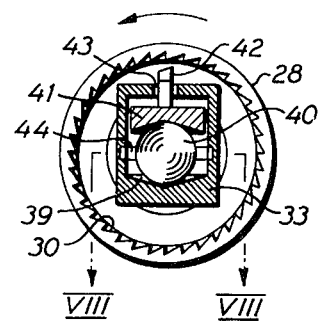
FIG. 6 is a cross sectional and elevational view along line VI — VI in FIG. 1.

In order to prevent the ball 40 from bouncing off the side wall of the housing 33 when it has moved from the central position in the bowl shown in FIGS. 1 and 6, due to inclination or sharp retardation of the motor car, there are provided in the side wall of the housing 33 four round permanent magnets 44 the adjacent ends of which are spaced and have opposite magnetic polarities.

Thus, when the steel ball 40 has been displaced from the central position towards the side wall of the housing 33 it will adhere to one or two of the magnets and will be maintained in the position wherein the plate 41 is lifted and the latch 42 is engaged with the toothed rim 30, against shocks or vibrations tending to return the ball towards the central position shown.

Whe the spindle 11 is rotated by the associated spring mounted in the spring case 12 the latch 42 will be positively pressed down by cam action provided by the toothed rim 30 rotating clockwise as seen in FIG. 6, and thus the pressure exerted on the plate 41 will urge the ball 40 towards the central position against the attraction provided by the magnet(s) 44.

Figure 2:
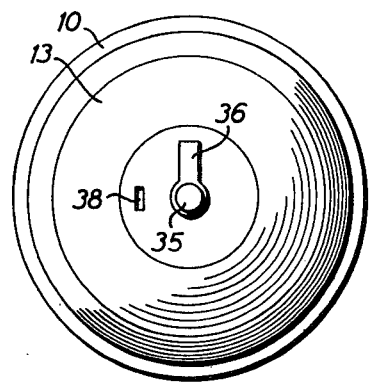
FIG. 2 is an end view from the right as seen in FIG. 1.
Figure 3:
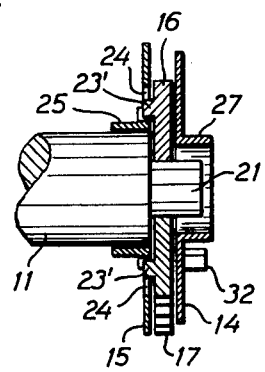
FIG. 3 is an axial sectional view of part of the locking mechanism.
Figure 4:
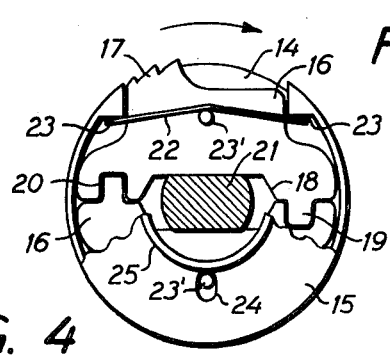
FIG. 4 is an elevational view along line IV — IV in FIG. 1 excluding parts of the housing rotatable with the spindle.
Figure 5:
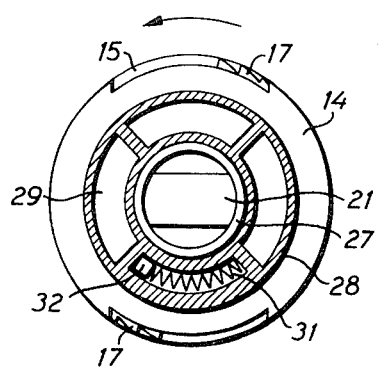
FIG. 5 is a cross sectional and elevational view along line V — V in FIG. 1.

Since it is essential, as will be seen from the above description, that the bowl 39 as well as the plate 41 is arranged substantially horizontally and that the latch 42 is directed substantially vertically, this would mean, that the retractor could be mounted only in a predetermined position, namely the position shown in FIG. 1. However, in certain cases the retractor is arranged on the floor of the motor car and in other cases the retractor is placed on the side wall of the car, i.e. either in one or the other of two mutually perpendicular positions. The improvement in the retractor according to the invention comprising the rotatable housing 33 has been made in order to make this alternative mounting of the retractor possible. If the retractor has to be disposed in a position, rotated 90° about the axis of the spindle 11 in relation to the position shown in FIG. 1, the projection 37 will be lifted from the recess 38 in which it is introduced in the position according to FIGS. 1 and 2, and thereafter the housing 33 is rotated 90° by the arm 36 which is then allowed to snap into the other recess 38 at its protrusion 37. This rotation of the housing 33 can of course be made in connection with the mounting of the retractor and thus it is sufficient to store only one ype of strap retractors which can be adjusted for mounting on the floor or on the wall in the motor car. However, it is of course also possible to set the arm 36 in a predetermined position during manufacture and then to permanently fix it in this position by ultrasonic welding or in any other suitable way. Even if the setting is made in this way during manufacture the rotatable housing 33 provides a substantial advantage from a manufacturing point of view.

The locking mechanism of the type described comprising a ball and a bowl in the housing 33 can obviously be replaced by another locking mechanism, for instance a locking mechanism having a pendulum, and also in that case the rotatable housing 33 provides an advantage from a manufacturing and mounting point of view.

It will be evident, but it is still worth mentioning, that the mounting of the retractor according to the invention will be extremely simple, since only a few elements need to be mounted at the final assembly of the locking device. The housing 14 closed by the lid 15 in which the locking members 16 are mounted is fitted into the frame, after which the wheel 28 with the spring 31 placed therein is slipped onto the connecting piece 27 of the housing during introduction of the projection 32 into the recess 29 which receives the spring 31. Then the pre-assembled housing 33 provided with ball 40 and latch 42, is mounted in the wheel 28, after which the cover 13 is put into its place and is fixed to the frame 10 in a suitable manner. The pivot 35 projecting from the cover 13 is provided with the arm 36, which can be fixed to the pivot by ultrasonic welding, and thereafter the mounting of the locking mechanism is concluded. As can be seen the operations are very simple and need no accurate adjustments, nd furthermore the elements of the locking mechanism are simple to manufacture, both the locking mechanism 14, 15, 16 for the spindle 11 and the supplementary locking mechanism 33, 40, 41, 42 for the wheel 28.

It will be apparent to those skilled in the art that various other modifications and variations in addition to those mentioned above could be made in the belt retractor of the invention without departing from the scope and spirit of the invention.

I claim:

1. A safety belt retractor comprising a frame, a spindle rotatably mounted in said frame; means biasing said spindle in a belt-retracting direction; a non-circular portion formed by said spindle; a first locking mechanism resiliently connected with the spindle for rotation therewith and for displacement thereby between nonrotating locking and rotatable non-locking positions; and including a support; two opposed radially displaceable locking members mounted on the support; bias means biasing the locking members to resiliently engage said non-circular portion of the spindle at slow rotational movements of the spindle; a stationary locking element on the frame, said locking members being displaced by the spindle into engagement with said stationary locking element by a rapid rotational movement of the spindle exceeding the biasing force of the bias means, whereby the non-circular portion cams the locking members into nonrotating locking position with the stationary locking element for locking the spindle against rotational movement; a second locking mechanism cooperating with the first locking mechanism to actuate the first in response to at least one of the parameters inclination and deceleration of the retractor; the second locking mechanism including a toothed rim and a resilient drive connection between the support and the toothed rim; and further including a locking means responsive to inclination or deceleration of the retractor for engaging said toothed rim to thereby prevent said toothed rim from rotating with the spindle and thereby actuate the first locking mechanism.

2. A retractor according to claim 1 wherein the locking members are identical and reversed in relation to each other, each member having an edge protrusion and an edge recess, and being guided for radial movement by the engagement between the edge protrusion on one member and an edge recess of the other member.

3. A retractor according to claim 1 wherein the support has an abutment for each locking member and each locking member a projection and said bias means comprises for each locking member a bar spring the ends of which engage one of the abutments in the support and the central portion of which engages the projection on the associated locking member.

4. A retractor according to claim 1 wherein the toothed rim is toothed on the radially inner side thereof.

5. A retractor according to claim 1 wherein said locking means comprises a latch and a universally movable pendulum member operating said latch.

6. A retractor according to claim 5 wherein the pendulum member comprises a ball and a concave bowl in which the ball is free to roll, the latch contacting the ball and operated thereby into engaged position with the toothed rim upon rolling of the ball.

7. A retractor according to claim 6 wherein the latch comprises a concave surface contacting the ball diametrically opposite to the bowl.

8. A retractor according to claim 5 wherein the bowl is arranged in a separate housing and the latch is movably mounted in this housing projecting therefrom.

9. A retractor according to claim 8 wherein said separate housing is mounted for rotation about the axis of the spindle and can be fixedly locked in at least two mutually perpendicular positions.

10. A retractor according to claim 9 wherein said separate housing is rotatably mounted in the center of the toothed rim and in a casing covering the locking mechanism, and further including a setting device for the housing accessible on the outer surface of the casing for fixedly locking said housing.

11. A retractor according to claim 6 wherein there are arranged concentrically about the center of the bowl magnets for attracting the ball which is made of magnetic material.

12. A retractor according to claim 11 wherein the magnets comprise permanent magnets circularly curved and arranged in a circle the adjacent ends of the magnets having opposite polarities and being spaced from each other.

* * * * *